United States Patent
Ramasamy et al.

(10) Patent No.: US 9,454,396 B2
(45) Date of Patent: Sep. 27, 2016

(54) THIN CLIENT COMPUTING DEVICE HAVING TOUCH SCREEN INTERACTIVE CAPABILITY SUPPORT

(71) Applicant: AMERICAN MEGATRENDS, INC., Norcross, GA (US)

(72) Inventors: Veerajothi Ramasamy, Chennai (IN); Varadachari Sudan Ayanam, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 38 days.

(21) Appl. No.: 14/587,352

(22) Filed: Dec. 31, 2014

(65) Prior Publication Data

US 2016/0188356 A1 Jun. 30, 2016

(51) Int. Cl.
 *G06F 9/455* (2006.01)
 *G06F 3/041* (2006.01)
 *G06F 9/44* (2006.01)

(52) U.S. Cl.
 CPC ......... *G06F 9/45558* (2013.01); *G06F 3/0416* (2013.01); *G06F 9/4445* (2013.01); *G06F 9/45533* (2013.01)

(58) Field of Classification Search
 CPC ...................... G06F 9/45533; H04L 29/08072
 USPC ............................................... 718/1; 709/219
 See application file for complete search history.

(56) References Cited

U.S. PATENT DOCUMENTS

| 8,015,232 | B2 * | 9/2011 | Vigil | G06F 3/0227 345/173 |
| 8,312,471 | B2 * | 11/2012 | Davis | G06F 12/0866 718/1 |
| 8,677,472 | B1 * | 3/2014 | Dotan | H04L 67/22 726/12 |
| 9,250,854 | B2 * | 2/2016 | Beveridge | G06F 9/4445 |
| 9,304,662 | B2 * | 4/2016 | Beveridge | G06F 3/0484 |
| 2011/0246904 | A1 * | 10/2011 | Pinto | G06F 9/4445 715/740 |
| 2014/0267049 | A1 * | 9/2014 | Durham | G06F 3/0235 345/168 |
| 2015/0346931 | A1 * | 12/2015 | Moran | G06F 3/0484 715/740 |

\* cited by examiner

*Primary Examiner* — Andy Ho
(74) *Attorney, Agent, or Firm* — Locke Lord LLP; Tim Tingkang Xia, Esq.

(57) ABSTRACT

Certain aspects of the present disclosure relates to a system capable of providing touch screen interactive capability to a thin client computing device. The computing device includes: a touch screen display supporting touch screen interactive capability, and a thin client controller. The thin client controller includes a processor, and a memory. The memory stores an operating system which does not support the touch screen interactive capability of the touch screen display, and computer executable code. When executed at the processor, the computer executable code causes the processor to: display a touch screen user interface to emulate computer peripherals, define certain user touch screen operations and certain corresponding thin client management functions, receive one or more user touch screen operations from a user through the touch screen user interface on the touch screen display, and perform the thin client management functions according to the received user touch screen operations.

25 Claims, 3 Drawing Sheets

THIN CLIENT COMPUTING DEVICE HAVING TOUCH SCREEN INTERACTIVE CAPABILITY SUPPORT

FIELD

The present disclosure relates generally to virtual desktop infrastructure (VDI), and more particularly to VDI systems using a thin client computing device having touch screen interactive capability support and methods thereof.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A thin client, sometimes also known as lean client, zero client, or slim client, is a computing device or a computer program that depends heavily on some other computer, such as a server, to fulfill its computational roles. This is different from the traditional fat client, which is a computer having sufficient resources and designed to take on these roles by itself. The server usually has system resources such as operating system, application program, powerful central processing units (CPUs), large storage space including volatile and non-volatile memory, and network connections. In a virtual desktop infrastructure (VDI) system, a large number of thin clients may be connected through the network connection, access one or more virtual desktops on one or more virtual machines running on the server to share the system resources.

A conventional thin client may have at least a thin client controller, a screen display, a keyboard, and a mouse. In certain thin client systems, multimedia is supported. With the deployment of touch screen displays, mobile and tablet computing devices, conventional keyboard and mouse may be eliminated by emulating a keyboard and mouse function on the touch screen display. Therefore it is desirable to provide touch screen interactive capability support to the touch screen display, mobile and tablet computing devices so these devices can also be used as thin clients for accessing various virtual desktops.

Therefore, an unaddressed need exists in the art to address the aforementioned deficiencies and inadequacies.

SUMMARY

In one aspect, the present disclosure relates to a virtual desktop system. In certain embodiments, the system has one or more computing devices. The computing device is functioning as a thin client. The computing devices includes a touch screen display supporting touch screen interactive capability, and a thin client controller having a processor and a storage device storing an operating system and computer executable code. The operating system does not support the touch screen interactive capability of the touch screen display. When the computer executable code is executed at the processor, the computer executable code is configured to: display a touch screen user interface on the touch screen display to emulate computer peripherals, define certain user touch screen operations and certain thin client management functions such that each of the thin client management functions corresponds to at least one of the user touch screen operations, receive one or more of the user touch screen operations from a user through the touch screen user interface on the touch screen display, and, in response to receiving the user touch screen operations, perform the corresponding thin client management functions based on the received user touch screen operations.

In certain embodiments, the system further includes a virtual desktop server. The virtual desktop server is communicatively connected to the computing device via a network. The virtual desktop server stores a hypervisor and certain virtual machines (VMs). The virtual desktop server is configured to execute the hypervisor, and execute the VMs on the executed hypervisor. Each of the executed VMs is configured to provide one or more virtual desktops accessible for one of the computing devices.

In certain embodiments, the thin client controller also has: a communication interface module, and a network interface controller. The communication interface module is configured to communicate between the thin client controller and the touch screen display over a communication channel. The network interface controller is configured to support network communication among the virtual desktops, the thin client controller, and the touch screen display over the network. The communication channel includes: a serial bus, a universal serial bus (USB), an inter-integrated circuit (I2C) bus, a wireless communication channel, and an intelligent platform management bus (IPMB).

In certain embodiments, the touch screen user interface on the touch screen display includes: a soft keyboard, a touch control command area, and a soft mouse.

In certain embodiments, the computer executable code is further configured to configure the computing device as the thin client, the soft keyboard, the soft mouse, the touch control command area, the network, and the touch screen display. A size and a location of each of the soft keyboard, the touch control command area and the soft mouse are configurable through the computer executable code.

In certain embodiments, the computer executable code is further configured to: select a location to enter text by the user by receiving a user touch screen operation at a text box displayed on the touch screen display, display the soft keyboard to allow the user to enter text, and enter a key displayed on the touch screen display or a user touch screen operation to remove the soft keyboard and return the touch screen display to display.

In certain embodiments, the computer executable code has: an input module, an input processing module, a display module, and an execution module. The input module is configured to receive the user touch screen operations. The input processing module is configured to process and interpret the received user touch screen operations, and determine the corresponding thin client management functions to be performed in response to the received user touch screen operations. The display module is configured to display the touch screen user interface, and user interactive response to the user. The execution module is configured to perform the corresponding thin client management functions according to the received user touch screen operations.

In certain embodiments, the thin client management functions may include: starting a virtual desktop session, displaying a login screen on the touch screen display, performing virtual desktop operations in the virtual desktop session, and ending the virtual desktop session.

In another aspect, the present disclosure relates to a computer-implemented method of providing touch screen interactive capability support to a computing device. In certain embodiments, the method includes following operations at the processor of the thin client controller: displaying a touch screen user interface on a touch screen display of a computing device to emulate computer peripherals, defining certain user touch screen operations and certain thin client management functions such that each of the thin client management functions corresponds to at least one of the user touch screen operations, receiving one or more user touch screen operations from a user through the touch screen user interface on the touch screen display, and in response to receiving the user touch screen operations, performing the corresponding thin client management functions based on the received user touch screen operations. The touch screen display supports touch screen interactive capability, and the thin client controller has an operating system that does not supporting the touch screen interactive capability of the touch screen display.

In certain embodiments, the computing device includes: the touch screen display supporting the touch screen interactive capability, and the thin client controller. The thin client controller has the processor, a communication interface module, a network interface controller, and a memory. The communication interface module is configured to communicate between the thin client controller and the touch screen display over a communication channel. The network interface controller is configured to support network communication among certain virtual desktops, the thin client controller, and the touch screen display over a network. The memory stores and operates the operating system and computer executable code. The computer executable code, when executed at the processor, causes the processor to support the touch screen interactive capability on the touch screen display.

In certain embodiments, the computer executable code has: an input module, an input processing module, a display module, and an execution module. The input module is configured to receive the user touch screen operations. The input processing module is configured to process and interpret the received user touch screen operations, and determine the corresponding thin client management functions to be performed in response to the received user touch screen operations. The display module is configured to display the touch screen user interface, and user interactive response to the user. The execution module is configured to perform the corresponding thin client management functions according to the received user touch screen operations.

In certain embodiments, the computer-implemented method also includes: configuring, at the processor of the thin client controller, the computing device as the thin client, the soft keyboard, the soft mouse, the touch control command area, the network, and the touch screen display.

In certain embodiments, the computer-implemented method also includes following operations at the processor of the thin client controller: selecting a location to enter text by the user by receiving a user touch screen operation at a text box displayed on the touch screen display, displaying the soft keyboard to allow the user to enter text, entering a key displayed on the touch screen display or a user touch screen operation to remove the soft keyboard, and returning the touch screen display to display.

In certain embodiments, the thin client management functions include: starting a virtual desktop session, displaying a login screen on the touch screen display, performing virtual desktop operations in the virtual desktop session, and ending the virtual desktop session.

In yet another aspect, the present disclosure relates to a non-transitory computer storage medium. The non-transitory computer storage medium stores computer executable code. When the computer executable code is executed by a processor of a thin client controller of a computing device functioning as a thin client, the computer executable code is configured to: display a touch screen user interface on a touch screen display of the computing device to emulate computer peripherals, define certain user touch screen operations and certain thin client management functions such that each of the thin client management functions corresponds to at least one of the user touch screen operations, receive one or more user touch screen operations from a user through the touch screen user interface on the touch screen display, and in response to receiving the user touch screen operations, perform the corresponding thin client management functions based on the received user touch screen operations. The touch screen display supports touch screen interactive capability. The thin client controller has an operating system that does not supporting the touch screen interactive capability of the touch screen display.

In certain embodiments, the computer executable code includes: an input module, an input processing module, a display module, and an execution module. The input module is configured to receive the one or more user touch screen operations from the user. The input processing module is configured to process and interpret the received one or more user touch screen operations, and determine certain corresponding thin client management functions to be performed in response to the user touch screen operations received. The display module is configured to display the touch screen user interface on the touch screen display, and user interactive response to the user. The execution module is configured to perform the thin client management functions according to the user touch screen operations received.

In certain embodiments, the touch screen user interface on the touch screen display includes: a soft keyboard, a touch control command area, and a soft mouse. A size and a location of each of the soft keyboard, the touch control command area and the soft mouse are configurable through the computer executable code.

In certain embodiments, the computer executable code is further configured to: configure the computing device as the thin client, the soft keyboard, the soft mouse, the touch control command area, the network, and the touch screen display.

In certain embodiments, the computer executable code is further configured to: select a location to enter text by the user by receiving a user touch screen operation at a text box displayed on the touch screen display, display the soft keyboard to allow the user to enter text, and enter a key displayed on the touch screen display or a user touch screen operation to remove the soft keyboard and return the touch screen display to display.

In certain embodiments, the thin client management functions include: starting a virtual desktop session, displaying a login screen on the touch screen display, performing virtual desktop operations in the virtual desktop session, and ending the virtual desktop session.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings FIGS. 1-3. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
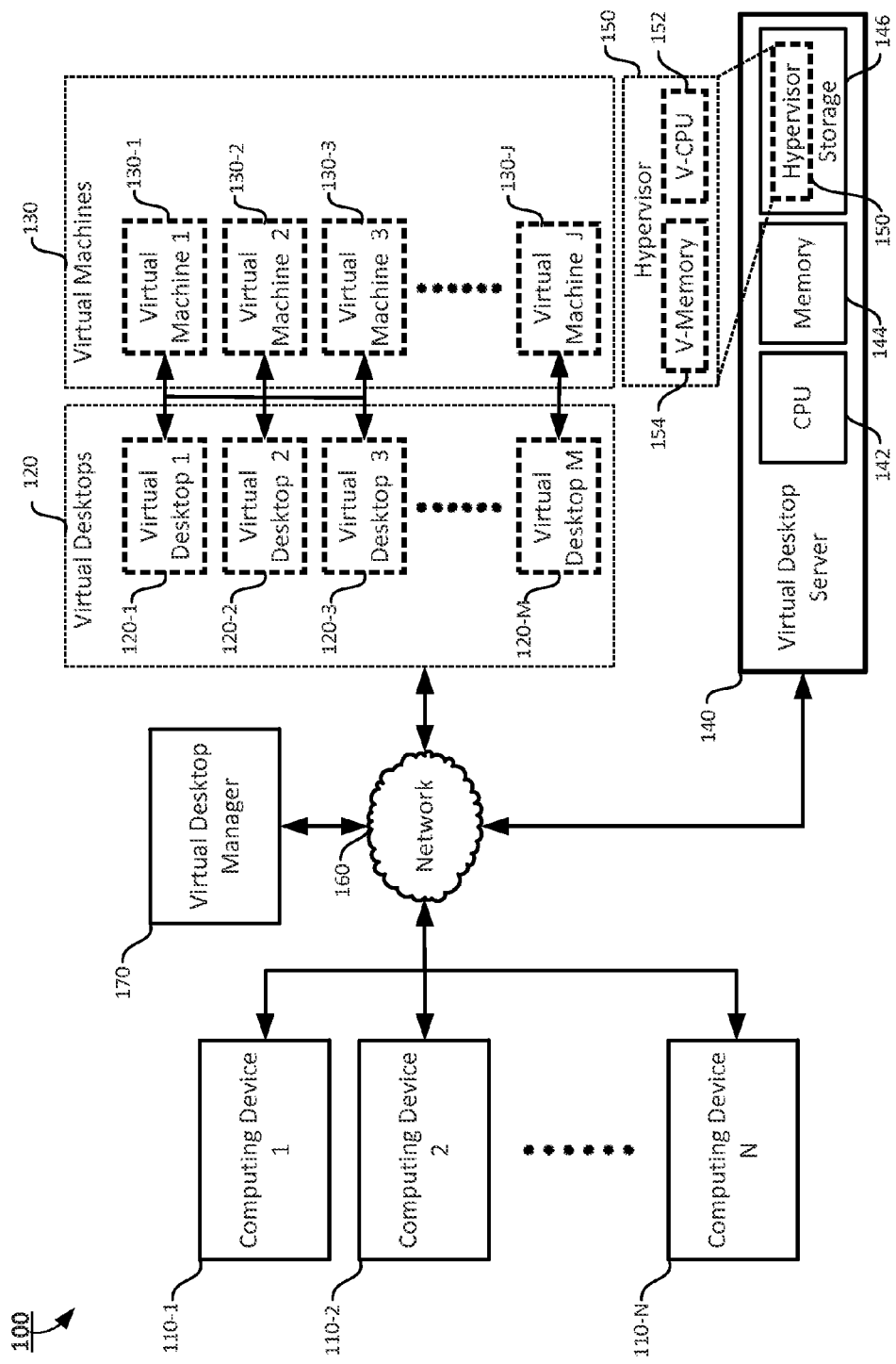
FIG. 1 schematically depicts a virtual desktop infrastructure (VDI) system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The term "launch a virtual machine", as used herein, generally refers to a process of instantiating or constructing a new virtual machine instance with a specific virtual machine ID on a hypervisor. Once the virtual machine is launched, the virtual machine in an "on" state. The term "shutting down a virtual machine", as used herein, generally refers to a process of deleting or destructing an existing virtual machine instance with a specific virtual machine ID on a hypervisor. Once the virtual machine is destructed, the virtual machine is in an "off" state.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-3, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In accordance with the purposes of present disclosure, as embodied and broadly described herein, in certain aspects, the present disclosure relates to a virtual desktop system. FIG. 1 schematically depicts a VDI system according to certain embodiments of the present disclosure. As shown in FIG. 1, the system 100 includes: one or more computing devices 110, a virtual desktop server 140, a network 160, and a virtual desktop manager 170. The computing devices 110, the virtual desktop server 140, and the virtual desktop manager 170 are communicatively interconnected by the network 160. The network 160 may be a wired or wireless network, and may be of various forms, such as a public network and a private network. Examples of the network 160 may include, but not limited to, a local area network (LAN) or wide area network (WAN) including the Internet. In certain embodiments, two or more different networks 160 may be applied to connect the computing devices 110, the virtual desktop server 140, and the virtual desktop manager 170.

The virtual desktop server 140 is a computing device which serves as a server for providing virtual machine services for the system 100. In certain embodiments, the virtual desktop server 140 may include necessary hardware and software components to perform certain predetermined tasks. For example, as shown in FIG. 1, the virtual desktop server 140 includes one or more central processing units (CPUs) 142, memory 144, and a storage 146. Further, the virtual desktop server 140 may include other hardware components and software components (not shown) to perform its corresponding tasks. Examples of these hardware and software components may include, but not limited to, other required memory, interfaces, buses, Input/Output (I/O) modules and peripheral devices.

The CPU 142 is a host processor which is configured to control operation of the virtual desktop server 140. The CPU 142 can execute the hypervisor 150 as well as other applications of the virtual desktop server 140. In certain embodiments, the virtual desktop server 140 may run on more than one CPU as the host processor, such as two CPUs, four CPUs, eight CPUs, or any suitable number of CPUs.

The memory 144 can be a volatile memory, such as the random-access memory (RAM), for storing the data and information during the operation of the virtual desktop server 140.

The storage 146 is a non-volatile data storage media for storing the hypervisor 150 and other applications of the virtual desktop server 140. Examples of the storage 146 may include flash memory, memory cards, USB drives, hard drives, floppy disks, optical drives, or any other types of suitable non-volatile data storage devices.

The hypervisor 150 is a program that allows multiple virtual machine (VM) instances 130-1, 130-2, . . . , 130-J to run simultaneously and share a single hardware host, such as the virtual desktop server 140. The hypervisor 150, when executed at the CPU 142 or any other processor, implements hardware virtualization techniques and allows one or more operating systems or other applications to run concurrently as guests of one or more virtual machines on the virtual desktop server 140. The hypervisor 150 allows each user to run an operating system instance as a VM. In certain embodiments, the hypervisor 150 can be of various types and designs, such as MICROSOFT HYPER-V, XEN, VMWARE ESX, or other types of hypervisors.

As shown in FIG. 1, when the hypervisor instance 150 runs on the virtual desktop server 140, the hypervisor 150 emulates a virtual computer machine, including a virtual CPU 152, and a virtual memory 154. A plurality of VMs 130-1, 130-2, 130-3, . . . , and 130-J can operate in the hypervisor 150. Each VM 130 can run a virtual machine operation system (VMOS), such as WINDOWS or LINUX. For brevity, unless otherwise noted, a VM and the VMOS run in that VM are collectively referred to as a VM.

In one embodiment, the VMs 130 include J virtual machines 130, which include a first virtual machine 130-1, a second virtual machine 130-2, a third virtual machine 130-3, . . . , and a J-th virtual machine 130-J, where J is a positive integer. In certain embodiments, one or more of virtual desktops 120 are running on each of the virtual machines. In one embodiment, the virtual desktops 120 include M virtual desktops 120, which include a first virtual desktop 120-1, a second virtual desktop 120-2, a third virtual desktop 120-3, . . . , and a M-th virtual desktop 120-M, where M is a positive integer. In one embodiment, each of the virtual desktops 120 is running on a corresponding virtual machine 130. In this case, the number M of the virtual desktops 120 is equal to the number J of the virtual machines 130. In another embodiment, each of the virtual desktops 120 runs on one or more virtual machines 130. In this case, the number M of the virtual desktops 120 is different from the number J of the virtual machines 130.

The virtual desktop manager 170 is a controller to control and manage the operation of the virtual desktops 120 and the virtual machines 130 of the system 100. As described above, the virtual machines 130 provides the virtual desktops 120 to various user devices operated by various users. The virtual desktop manager 170 allows an administrator of the system 100 to set up, administer, and manage the virtual desktops 120 and the virtual machines 130 of the system 100.

Each of the computing devices 110 functions as a thin client, which is operated by various users to access one of the virtual desktops 120. In certain embodiments, instead of having access to one of the virtual desktops 120, each of the computing devices 110 functioning as the thin client may also be operated to access a physical desktop (not shown) of the system 100. In certain embodiments, each of the computing devices 110 is in communication with the virtual desktop manager 170 through the network 160. As shown in FIG. 1, the computing devices 110 includes a first computing device 110-1, a second computing device 110-2, . . . , and a N-th computing device 120-N, where N is a positive integer. In other words, the number of the computing devices 110 is N. In certain embodiments, the number N of the computing devices 110 may be equal to the number M of the virtual desktops 120 and/or the number J of the virtual machines 130, or may be different from the number M of the virtual desktops 120 and/or the number J of the virtual machines 130.

Figure 2:
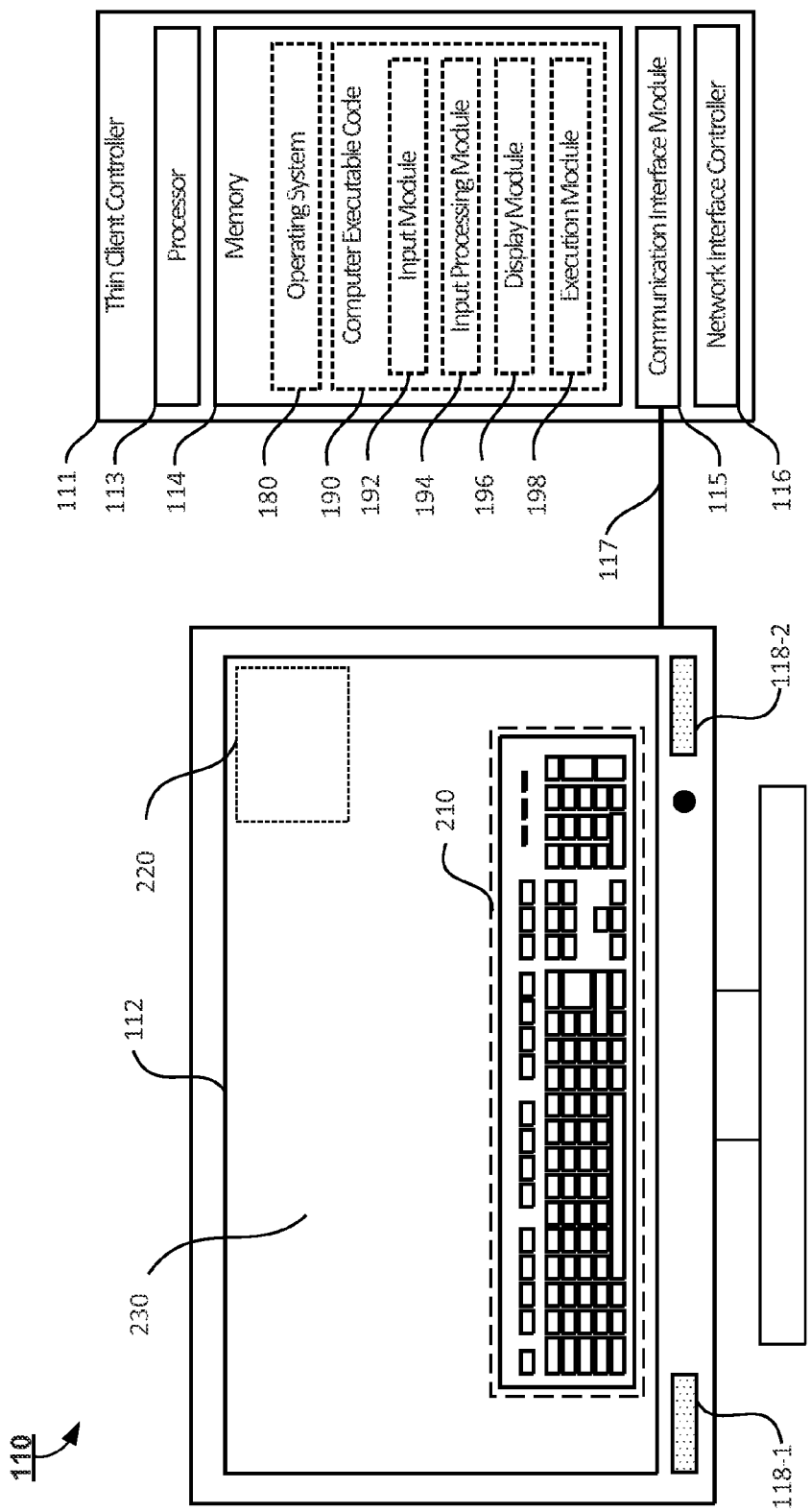
FIG. 2 schematically depicts a computing device according to certain embodiments of the present disclosure.

FIG. 2 schematically depicts a computing device according to certain embodiments of the present disclosure. As shown in FIG. 2, the computing device 110, which functions as a thin client, includes a thin client controller 111 and a touch screen display 112. In certain embodiments, the computing device 110 can be a desktop computer, a laptop computer, a netbook computer, a notebook computer, a tablet computer, and/or other network connected terminal devices. In certain embodiments, the touch screen display 112 supports touch screen interactive capability.

Each of the computing devices 110 is in communication with the virtual desktop manager 170 through the network 160. Each of the computing devices 110 has a thin client user interface displayed on the touch screen display 112 for the user. The virtual desktops 120 are accessible through the network 160.

The thin client controller 111 controls the operation of the computing device 110. In certain embodiments, the thin client controller 111 is a separate electronic hardware device to communicate with the touch screen display 112. In this case, the thin client controller 111 may include necessary hardware and software components to perform certain predetermined tasks. For example, as shown in FIG. 2, the thin client controller 111 includes a processor 113, a memory 114, a communication interface module 115, and a network interface controller 116. In certain embodiments, the thin client controller 111 is implemented as firmware that resides on the touch screen display 112. In this case, the hardware components may be provided by the touch screen display 112.

The processor 113 controls operation of the thin client controller 111. The processor 113 can execute the operating system 180 and the computer executable codes 190 as well as other applications of the processor 113. In certain embodiments, the thin client controller 111 may run on more than one processor as the host processor, such as two processors, four processors, eight processors, or any suitable number of processors. In certain embodiments, the processor 113 may be a part of the touch screen display 112.

The communication interface module 115 is configured to maintain communication between the thin client controller 111 and the touch screen display 112. When the thin client controller 111 sends control commands, and control data to the touch screen display 112 to display, the control commands, and control data are sent through the communication interface module 115 over a communication channel 117. When the touch screen display receives user touch screen operations, the user touch screen operations are also sent through the communication interface module 115 over the communication channel 117 for the thin client controller 111 to process. In one embodiment, the communication channel 117 is a serial bus, a universal serial bus (USB), an inter-integrated circuit (I2C) bus, or an intelligent platform management bus (IPMB) that has direct connection between the thin client controller 111 and the touch screen display 112. In another embodiment, the communication channel 117 is a wired or wireless communication network 160. In this case, the communication between the think client controller 111 and the touch screen display 112 goes through the communication interface module 115, the network interface controller 116 and over the network 160. When the thin client controller 111 and touch screen display 112 are built into one single unit, then the communication channel 117 may be an internal bus such as a serial bus, a USB bus, or other system bus used by the touch screen display 112. In one embodiment, the communication channel 117 is a serial bus to facilitate serial communication between the thin client controller 111 and the speakers 118-1 and 118-2. In another embodiment, the communication channel 117 is a USB bus to facilitate USB communication between the thin client controller 111 and the speakers 118-1 and 118-2. Other communication buses such as peripheral component interconnect (PCI) bus, firewire, and industry standard architecture (ISA) bus, can also be used for this purpose.

The network interface controller 116 is configured to support network communication among the virtual desktops 120, the thin client controller 111 and the touch screen display 112 through the network 160. In certain embodiments, the network 160 may include: a local area network (LAN), a wide area network (WAN), a Wi-Fi network, a wireless communication network, and the Internet.

The memory 114 is a non-volatile data storage media for storing an operating system 180, and computer executable code 190. Examples of the memory 114 may include flash memory, memory cards, USB drives, hard drives, floppy disks, optical drives, or any other types of non-volatile data storage devices. In certain embodiments, the operating system 180 of the computing device 110 does not offer touch screen interactive capability support. Since the touch screen display 112 supports touch screen interactive capability, the computer executable code 190 must offer touch screen interactive capability support such that a user may operate the touch screen display 112.

The computer executable code 190 is a program that may be executed at the processor 113. In certain embodiments, the computer executable code 190 can be implemented as firmware stored in the memory 114. In certain embodiments, the user of the computing device 110 can download such computer executable code 190 from a website for a computer or from an application store for any mobile devices.

In certain embodiments, the computer executable code 190 is used by the thin client controller 111 to provide touch screen interactive capability support to the computing device 110. The computer executable code 190 may include: an input module 192, an input processing module 194, a display module 196, and an execution module 198.

In certain embodiments, the input module 192 is configured to receive user touch screen operations on the touch screen display 112 over the communication channel 117 and the communication interface module 115. For example, the user touches a predetermined location on the touch screen display 112 to display a soft keyboard. This user touch screen operation is converted by the touch screen display 112 to a specific electronic signal, and the specific electronic signal is transmitted to the thin client controller 111 over the communication channel 117, and received at the input module 192.

In certain embodiments, the electronic signal received at the input module 192 is transmitted to the input processing module 194. The input processing module 194 is configured to process the electronic signal received. Based on the received electronic signal, the input processing module 194 determines one or more thin client management functions that the thin client controller 111 is to perform according to the user touch screen operations received. For example, in the case that the user touches the predetermined location to display the soft keyboard, the function to be performed by the thin client controller 111 is to display the soft keyboard on the touch screen display 112.

In certain embodiments, the display module 196 is configured to receive instructions from the input processing module 194, render the display image on the touch screen display 112, and transmit the rendered image to the touch screen display 112 over the communication channel 117. For example, in the case that the user touches the predetermined location to display the soft keyboard, the thin client controller 111 displays the soft keyboard on the touch screen display 112.

In certain embodiments, the execution module 198 is configured to perform any management functions for the virtual desktops 120 unrelated to display. For example, if the user would like to enable the audio redirection, the input module 192 receives a user touch screen operation for enabling the audio redirection, the input processing module determines that thin client management function to perform is to "enable the audio redirection", and the execution module 198 receives the instruction to "enable the audio redirection", an sends instructions to enable the audio redirection to the touch screen display 112 over the communication channel 117.

In certain embodiments, the touch screen display 112 may have a touch screen display panel to display information to a user. The touch screen display 112 may also have a pair of speakers 118-1 and 118-2 to provide stereo sounds for the touch screen display 112. When the thin client controller 111 enables audio redirection, the audio signal from the virtual desktop 120 may be redirected to the pair of speakers 118-1 and 118-2.

The touch screen display 112 is an electronic visual display that the user can control through simple or multi-touch gestures by touching the screen with a special stylus/pen and-or one or more fingers. Some touch screens require a user to use an ordinary or specially coated glove to work, while others require a special stylus/pen only. The user can use the touch screen display to react to what is displayed and to control how it is displayed (for example by zooming the text size).

In certain embodiments, the touch screen display 112 is connected to the thin client controller 111 through a USB connector, a digital visual interface (DVI) connector, or a high-definition multimedia interface (HDMI) connector. In other embodiments, the touch screen display 112 is connected to video display interfaces such as a video graphics array (VGA) using a VGA connector, a super video graphics array (SVGA) using a SVGA connector, an extended graphic array (XGA) using a XGA connector, a quad extended graphics array (QXGA) using a QXGA connector, and a full high-definition (FHD) using an HDMI connector.

The touch screen display 112 enables the user to interact directly with what is displayed, rather than using a mouse, touchpad, or any other intermediate device (other than a stylus, which is optional for most modern touch screen displays).

Touch screens are common in devices such as game consoles, personal computers, tablet computers, and smartphones. They can also be attached to computers or, as terminals, to networks. The popularity of smartphones, tablets, and many types of information appliances is driving the demand and acceptance of common touch screen displays for portable and functional electronics. Touch screen displays are found in the medical field and in heavy industry, as well as for automated teller machines (ATMs), and kiosks such as museum displays or room automation, where keyboard and mouse systems do not allow a suitably intuitive, rapid, or accurate interaction by the user with the display's content. The touch screen displays can also be integrated as part of a thin client such as the thin client having the thin client controller 111 built-in with the touch screen display 112.

In certain embodiments, when the computer executable code 190 is executed at the processor 113 of the thin client controller 111, the computer executable code 190 is configured to: display a touch screen user interface on the touch screen display to emulate computer peripherals, define certain user touch screen operations and certain thin client management functions such that each of the thin client management functions corresponds to at least one of the user touch screen operations, receive one or more of the user touch screen operations from a user through the touch screen user interface on the touch screen display, and in response to receiving the user touch screen operations, perform the corresponding thin client management functions according to the received user touch screen operations.

In certain embodiments, the thin client controller 111 provides the touch screen user interface on the touch screen display 112 for the user to interact with the touch screen display 112 through various user touch screen operations. The touch screen user interface may include: a soft keyboard 210, a touch control command area 220, and a soft mouse 230. The soft keyboard 210 emulates a conventional keyboard and allows the user to enter information through the soft keyboard 210 over the communication channel 117 through the communication interface module 115. The touch control command area 220 allows the user to enter certain touch control commands through certain user interactions on the touch screen display 112. The soft mouse 230 emulates a conventional mouse and allows the user to perform conventional mouse operation on the touch screen display 112 without the conventional mouse.

In certain embodiments, the soft keyboard 210 is emulated and displayed on the touch screen display 112 through the display module 196 to allow the user to enter text through the touch screen display 112 without the conventional keyboard. In one embodiment, the size and location of the soft keyboard 210 are configurable through the computer executable code 190. In another embodiment, the soft keyboard 210 is located at the center and bottom of the touch screen display 112. In other embodiments, the size and location of the soft keyboard 210 may be adjusted through the user touch screen operations, such as enlarge the soft keyboard 210, to reduce the soft keyboard 210, or move the soft keyboard 210 around on the touch screen display 112.

In certain embodiments, the touch control command area 220 is configured to allow the user to enter user touch screen operations. Each of the user touch screen operations corresponds to a thin client management function. In one embodiment, the size and location of the touch control command area 220 are configurable through the computer executable code 190. In another embodiment, the size is predetermined and the touch control command area 220 is placed at the top right corner of the touch screen display 112 as shown in FIG. 2. In other embodiments, the size and location of the touch control command area 220 may be adjusted through the user touch screen operations, such as enlarge the touch control command area 220, to reduce the touch control command area 220, or move the touch control command area 220 around on the touch screen display 112 as the user desires.

In certain embodiments, the soft mouse 230 is configured on the touch screen display 112 to allow the user to perform mouse operations on the touch screen display 112 without a conventional mouse. For example, on a displayed menu, user may user a stylus or one or more fingers to touch the menu item to make selections. This user touch screen operation is equivalent to a conventional mouse click, or mouse double click. In certain embodiments, the size and location of the soft mouse 230 are configurable through the computer executable code 190. In another embodiment, the size is the entire touch screen display area of the touch screen display 112, and the location of the soft mouse 230 may be anywhere on the entire touch screen display area of the touch screen display 112.

In certain embodiments, the computing device 110 having touch screen interactive capability support may operate in two operating modes: a local user interface mode, and a remote virtual desktop mode. When the computing device 110 is operating in the local user interface mode, the computing device 110 is just a standalone thin client, and the user can turn the computing device 110 on, turn the computing device 110 off, and run some local applications stored on the computing device 110. When the computing device 110 is operating in the remote virtual desktop mode, the user can turn the computing device 110 on, turn the computing device 110 off, configure a remote virtual desktop connection, or start a remote virtual desktop session.

In certain embodiments, the computing device 110 functioning as a thin client can be a small device with minimal requirement for hardware such as keyboard, mouse, monitor, and Ethernet card. This type of computing device is intended to reduce the cost involved in factors such as hardware, software, software and power. This is useful in different areas such as education, health care, gaming, advertisement, etc.

In other embodiments, the computing device 110 functioning as a thin client may be a firmware solution designed to support different VDI protocols such as RemoteFX (from Microsoft), HDX (from Citrix) and PCoIP (from VMware). A user can use this device to launch a remote virtual desktop session and connect to the virtual desktops 120 hosted in the virtual desktop server 140 as shown in FIG. 1.

In certain occasions, if the virtual desktop operating system (OS) operating at the remote virtual desktop environment (e.g. Windows 8) has support for touch screen and on-screen key board and mouse capabilities, user interaction is easy, convenient and faster within a remote virtual desktop session. In certain embodiments, however, the computing device 110 has an operating system that does not support touch screen interactive capability. In this case, the touch screen experience is limited to the remote virtual desktop session. The present disclosure describes an improvement of the thin client controller 111 to provide the same user experience in local user interface mode.

In certain embodiments, the computer executable code 190 is configured to perform certain thin client management functions to support touch screen interactive capability. The thin client management functions include: certain local user interface functions, certain thin client control functions, and certain remote virtual desktop functions.

In certain embodiments, the certain local user interface functions may include, among other things, closing a current window and navigate back to a previous window, zooming in/zooming out the thin client UI display, displaying remote desktop login page, launching a remote virtual desktop session with pre-stored user profile information, and no action will be performed when pre-stored user profile information is not present, enabling/disabling USB redirection and show the USB device class list to choose for redirection, enabling/disabling audio redirection, enabling/disabling auto resolution and use 'w' as width and 'h' as height, changing network settings to dynamic host configuration protocol (DHCP), changing network settings to Static and showing static internet protocol (IP) configuration page, disabling auto domain name system (DNS) and show DNS configuration page, changing the network settings, showing event log, and/or enabling/disabling Wi-Fi, and ping the host availability.

In certain embodiments, the certain thin client control functions include, among other things, displaying remote virtual desktop session login page, launching a remote virtual desktop session with pre-stored user profile information, and no action will be performed when pre-stored user profile information is not present, displaying a device classes to be redirected, with one tap on the devices to select the devices, and two taps to deselect the device, accessing utilities tools, displaying all menu items in mini windows, scrolling through main windows, opening a window, closing a window and navigating back to a window list (i.e. escape from current window), listing the network settings, listing the system general information, displaying thin client event log, and putting the thin client to sleep.

In certain embodiments, the remote virtual desktop operations include, among other things, exiting a remote virtual desktop session without user log-off, closing the current window that is part of thin client solution user interface, i.e. to close the dialogue of applications running outside a remote virtual desktop session, opening the thin client device system information page, displaying the list of USB device classes to be chosen to enable/disable redirection, and displaying and edit Date/Time.

In certain embodiments, the computer executable code 190 defines certain user touch screen operations to correspond some of the exemplary thin client management functions listed above. Table 1 below shows the user touch screen operations received from the control command area of the touch screen display 112 and the thin client management functions corresponding to the user touch screen operations according to certain embodiments of the disclosure. Each of the thin client management functions listed in the Table 1 may be implemented by the computer executable code 190. When a user touch screen operation is received from the control command area of the touch screen display 112, the computer executable code 190 performs the thin client management function that corresponds to the user touch screen operation.

TABLE 1

| User touch screen operations received | Thin client management functions to be performed |
|---|---|
| 'X' | close current window and navigate back to a previous window |
| '+' | zoom in thin client UI to supported next higher resolution |
| '−' | zoom out thin client UI to supported next lower resolution |
| 'K+' | enable and display soft keyboard |
| 'K−' | disable and remove soft keyboard from the touch screen display |
| 'L' | start a virtual desktop session and display remote virtual desktop session login page |

TABLE 1-continued

| User touch screen operations received | Thin client management functions to be performed |
|---|---|
| 'L+' | start a virtual desktop session with pre-stored user profile information, and perform no action when pre-stored user profile information is not present |
| 'u+' | enable USB redirection and show the USB device class list to choose for redirection |
| 'u−' | disable USB redirection |
| 'a+' | enable audio redirection |
| 'a−' | disable audio redirection |
| 'R+' | enable auto resolution settings for remote session |
| 'R−' | disable auto resolution and use 'w' as width and 'h' as height |
| 'd+' | change network settings to DHCP |
| 'd−' | change network settings to Static and show static IP configuration page |
| 'dn−' | disable auto DNS and show DNS configuration page |
| 'dn+' | change the network settings |
| 'E' | display event log |
| 'w+' | enable Wi-Fi |
| 'w−' | disable Wi-Fi |
| 'p <host IP>' | ping a host availability with its IP address |

Table 2 below shows the user touch screen operations received from the soft mouse on the touch screen display and thin client management functions corresponding to the user touch screen operations according to certain embodiments of the disclosure. Each of the thin client management functions listed in the Table 2 may be implemented by the computer executable code 190. When a user touch screen operation is received from the soft mouse on the touch screen display 112, the computer executable code 190 performs the thin client management function that corresponds to the user touch screen operation.

Table 3 below shows the user touch screen operations received from the soft keyboard on the touch screen display and thin client management functions corresponding to the user touch screen operations according to certain embodiments of the disclosure. Each of the thin client management functions listed in the Table 3 may be implemented by the computer executable code 190. When a user touch screen operation is received from the soft keyboard on the touch screen display 112, the computer executable code 190 performs the thin client management function that corresponds to the user touch screen operation.

TABLE 2

| User touch screen operations received | Thin client management functions to be performed |
|---|---|
| Pinch-in | zoom in thin client UI |
| Pinch-out | zoom out thin client UI |
| Flick left | display remote virtual desktop session login page |
| Flick right | establish a remote virtual desktop session with pre-stored user profile information, and perform no action when pre-stored user profile information is not present |
| Flick down | display a device classes to be redirected, with one tap on the devices to select the devices, and two tap to deselect the device |
| Flick up | access utilities tools |
| Single tap on the center of the touch screen display | enable audio redirection |
| Double tap on the center of the touch screen display | disable audio redirection |
| Single tap on the bottom left corner of the touch screen display and hold with one finger | display all menu items as mini windows flick right or left to scroll through main windows double tap to open the window |
| Single tap on the top right corner | end current virtual desktop session, close the window and go back to window list i.e. escape from current window |
| Single tap on the bottom right corner of the touch screen display and hold with one finger | display network settings |
| Single tap on the top right corner of the touch screen display and hold with one finger | display general information of thin client |
| Single tap on the top left corner of the trackpad and hold with one finger | display thin client event log |
| Scrub right and left anywhere on the touch screen display | put the thin client to sleep |

TABLE 3

| User touch screen operations received | Thin client management functions to be performed |
|---|---|
| Ctrl + Pause/Break | disconnect current remote virtual desktop session without user log-off |
| Alt + F4/. Esc | close current window that is part of thin client solution user interface, i.e. to close the dialogue of applications running outside the remote session. |
| Fn + F1 | open the thin client device system information page |
| Fn + F2 | display a list of USB device classes to be chosen to enable/disable redirection |
| Fn + F3 | enable audio redirection |
| Fn + F4 | disable audio redirection |
| Fn + F5 | toggle to enable/disable Wi-Fi |
| Fn + F6 | zoom out thin client UI |
| Fn + F7 | zoom in thin client UI |
| Fn + F8 | display thin client event log |
| Fn + F9 | display/edit Date/Time |
| Ctrl + Alt + Del | put thin client to sleep |

In certain embodiments, the computer executable code 190 implements the thin client management functions. When the user turns on the computing device 110, the thin client operates in the local user interface mode first. The display module 196 displays the touch screen user interface on the touch screen display 112. The user may perform certain user touch screen operations defined above and perform certain thin client management functions according to the user touch screen operations the user performed. In one embodiment, if the user wants to display remote virtual desktop session login page, the user uses a finger or a stylus to draw a capital "L" in the control command area 220 of the touch screen display 112 to display remote virtual desktop session login page. In another embodiment, the user uses the finger or the stylus to flick left to display remote virtual desktop session login page. If the user wants to end a remote virtual desktop session, the user uses the finger or the stylus to draw a capital "X" in the control command area 220 of the touch screen display 112 to display remote virtual desktop session login page. The user also can use the finger or the stylus to do one tap on the top right corner to end the remote virtual desktop session.

In certain embodiments, the computer executable code 190 is configured to perform the thin client management functions to configure the computing device 110 as the thin client. In certain embodiments, the computer executable code 190 may be further configured to perform the thin client management functions to configure the soft keyboard 210, the soft mouse 230, the touch control command area 220, the network 160, and the touch screen display 112, when the user enters one or more corresponding user touch screen operations on the touch screen display 112.

In certain embodiments, the computer executable code 190 is configured to select a location to enter text by the user by receiving a user touch screen operation at a text box displayed on the touch screen display, display the soft keyboard to allow the user to enter text, and enter a key displayed on the touch screen display or a user touch screen operation to remove the soft keyboard and return the touch screen display to display.

In certain embodiments, the computer executable code 190 is configured to start a virtual desktop session, displaying a login screen on the touch screen display, performing virtual desktop operations in the virtual desktop session, and ending the virtual desktop session.

Figure 3:
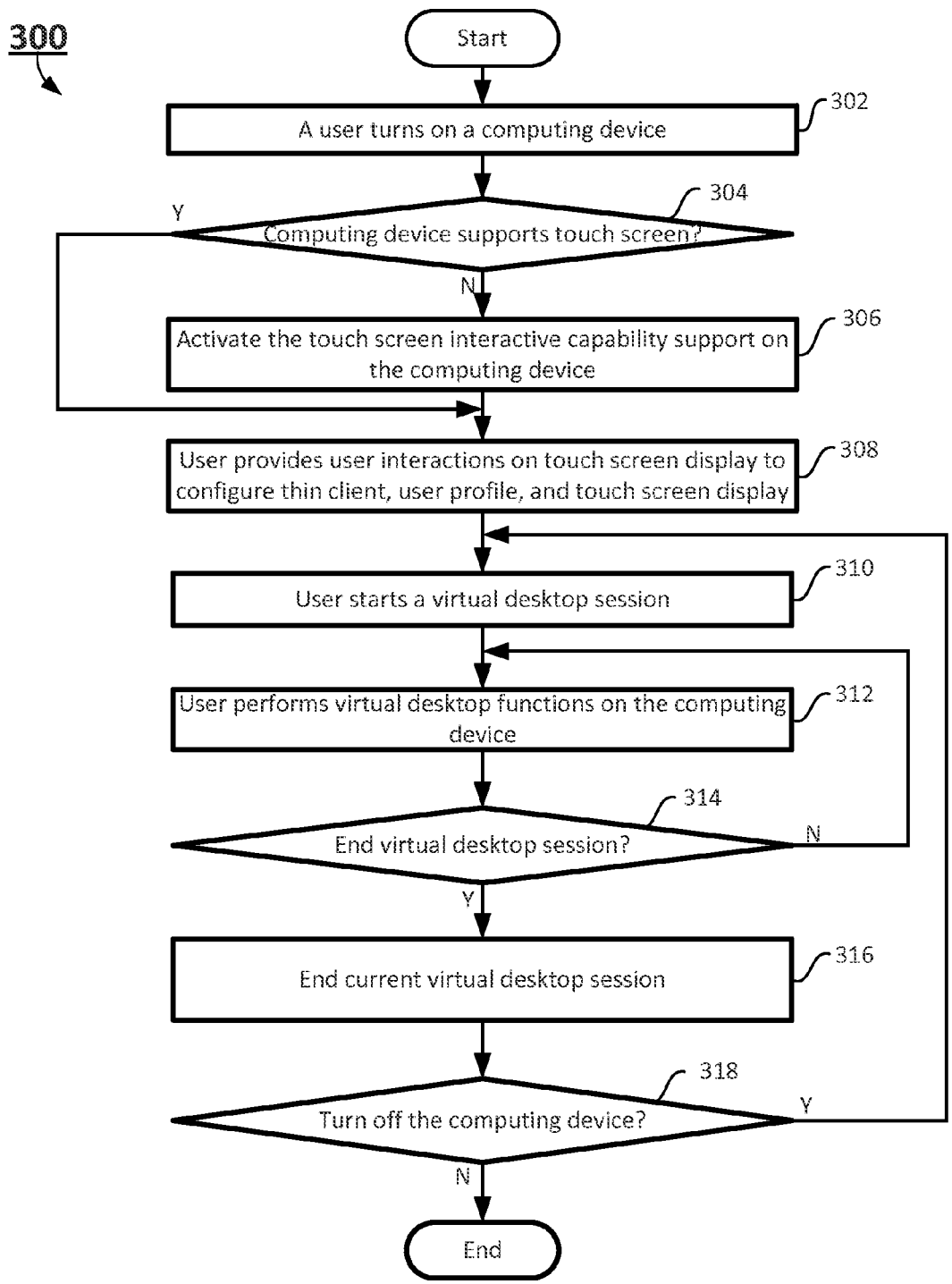
FIG. 3 schematically depicts a flow chart of a method of providing touch screen interactive capability support to the computing device according to certain embodiments of the present disclosure.

FIG. 3 schematically depicts a flow chart of a method of providing touch screen interactive capability support to the computing device according to certain embodiments of the present disclosure. The operation process of the method is implemented on the system 100 as shown in FIGS. 1-2. It should be understood that one or more steps within the method may be executed in different order (or concurrently) without altering the principles of the present disclosure.

At procedure 302, a user turns on a computing device 110. In response to the operation of the user, the thin client controller 111 of the computing device 110 is initiated and an operation process of providing touch screen interactive capability support to the computing device is started.

At procedure 304, the thin client controller 111 of the computing device 110 determines if the computing device 110 supports touch screen interactive capability. If the computing device 110 supports the touch screen interactive capability, the operation process proceeds to procedure 308. If the computing device 110 does not support the touch screen interactive capability, the operation process proceeds to procedure 306.

At procedure 306, the thin client controller 111 of the computing device 110 activates the touch screen interactive capability support on the computing device 110. If the thin client controller 111 does not have the computer executable code 190 stored in the memory 114, the thin client controller 111 of the computing device 110 may display a prompt on the screen to request the user to download the computer executable code 190 from a predetermined location over the network 160 shown on the screen. If the thin client controller 111 of the computing device 110 has the computer executable code 190 stored in the memory 114, the computer executable code 190 is executed and the touch screen interactive capability is activated.

At procedure 308, the user may operate in a local user interface mode, perform certain thin client management functions, such as, set up virtual desktop environment, one or more virtual desktop user profiles, and save the virtual desktop user profiles in the memory 114 of the thin client controller 111 of the computing device 110. The virtual desktop environment includes: the network environments, the virtual desktop server IP address, Wi-Fi connections, and any other suitable environmental parameters. At least one virtual desktop user profile is set up for each user, and the virtual desktop user profile may include: at least a username, a password, at least one IP address, and one or more authorized thin client devices 110.

At procedure 310, the user may operate in a remote virtual desktop mode by performing one or more user touch screen operations such as "start a virtual desktop session". As discussed above, the user may use his/her finger or a stylus to draw a capital "L" in the control command area 220 of the touch screen display 112 to display remote virtual desktop session login page. The user may also use the finger or the stylus to flick left to display remote virtual desktop session login page.

At procedure 312, the user enters the remote virtual desktop mode, and uses the window to perform remote virtual desktop operations.

At procedure 314, the thin client controller 111 of the computing device 110 constantly monitors the operation of the computing device 110 and determines if the remote virtual desktop operations are ended by the user. The operation process loops back to procedure 312 when the touch screen display 112 does not receive any "end virtual desktop session" user touch screen operation. When the thin client controller 111 of the computing device 110 receives an "end virtual desktop session" user touch screen operation from the user, the operation process proceeds to procedure 312 to end the current virtual desktop session. The user uses the finger or the stylus to draw a capital "X" in the control command area 220 of the touch screen display 112 to display remote virtual desktop session login page. The user may also use the finger or the stylus to single tap on the top right corner to end the remote virtual desktop session.

At procedure 316, the thin client controller 111 of the computing device 110 closes out the current virtual desktop session window, the end the current desktop session. The computing device 110 returns to the local user interface mode.

At procedure 318, the thin client controller 111 of the computing device 110 monitors any new user touch screen operations on the touch screen display 112. If a "turning off thin client" user touch screen operation is received, the operation process is terminated. Otherwise, the operation process proceeds to the procedure 310 to operate in local user interface mode and perform any local user interface operation, or perform other functions such as running a standalone program locally.

In another aspect, the present disclosure relates to a non-transitory computer storage medium. The non-transitory computer storage medium stores computer executable code 190. The computer executable code 190, when executed at one or more processor, may perform the method as described above. In certain embodiments, the non-transitory computer readable medium may include, but not limited to, any physical or virtual storage media. In certain embodiments, the non-transitory computer readable medium may be implemented as the memory 114 of the thin client controller 111 as shown in FIG. 2.

In certain embodiments, when the computer executable code 190 is executed by a processor 113 of a thin client controller 111 of a computing device 110 functioning as a thin client, the computer executable code 190 is configured to: display a touch screen user interface on a touch screen display 112 of the computing device 110 to emulate computer peripherals, define certain user touch screen operations and certain thin client management functions such that each of the thin client management functions corresponds to at least one of the user touch screen operations, receive one or more user touch screen operations from a user through the touch screen user interface on the touch screen display 112, and in response to receiving the user touch screen operations, perform the corresponding thin client management functions based on the received user touch screen operations. The touch screen display supports touch screen interactive capability. The thin client controller 111 has an operating system 180 that does not supporting the touch screen interactive capability of the touch screen display 112.

In certain embodiments, the computer executable code 190 includes: an input module 192, an input processing module 194, a display module 196, and an execution module 198. The input module 192 is configured to receive the one or more user touch screen operations from the user. The input processing module 194 is configured to process and interpret the received one or more user touch screen operations, and determine certain corresponding thin client management functions to be performed in response to the user touch screen operations received. The display module 196 is configured to display the touch screen user interface on the touch screen display 112, and user interactive response to the user. The execution module 198 is configured to perform the thin client management functions according to the user touch screen operations received.

In certain embodiments, the touch screen user interface on the touch screen display 112 includes: a soft keyboard 210, a touch control command area 220, and a soft mouse 230. A size and a location of each of the soft keyboard 210, the touch control command area 220, and the soft mouse 230 are configurable through the computer executable code.

In certain embodiments, the computer executable code 190 is further configured to: configure the computing device as a thin client, the soft keyboard 210, the soft mouse 220, the touch control command area 230, the network 160, and the touch screen display 112.

In certain embodiments, the computer executable code is further configured to: select a location to enter text by the user by receiving a user touch screen operation at a text box displayed on the touch screen display 112, display the soft keyboard 210 to allow the user to enter text, and enter a key displayed on the touch screen display 112 or a user touch screen operation to remove the soft keyboard 210 and return the touch screen display 112 to display.

In certain embodiments, the thin client management functions include: starting a virtual desktop session, displaying a login screen on the touch screen display, performing virtual desktop operations in the virtual desktop session, and ending the virtual desktop session.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
  a computing device functioning as a thin client, wherein the computing device comprises:
    a touch screen display supporting touch screen interactive capability; and
    a thin client controller having a processor and a storage device storing an operating system (OS) and computer executable code, wherein the OS does not support the touch screen interactive capability of the touch screen display,
  wherein the computer executable code, when executed at the processor, is configured to:
    display a touch screen user interface on the touch screen display to emulate computer peripherals;
    define a plurality of user touch screen operations and a plurality of thin client management functions, wherein each of the thin client management functions corresponds to at least one of the user touch screen operations;
    receive one or more of the user touch screen operations from a user through the touch screen user interface on the touch screen display; and in response to receiving the user touch screen operations, perform the corresponding thin client management functions based on the received user touch screen operations.

2. The system of claim 1, further comprising:
a virtual desktop server communicatively connected to the computing device via a network, the virtual desktop server storing a hypervisor and a plurality of virtual machines (VMs), wherein the virtual desktop server is configured to:
    execute the hypervisor; and
    execute the VMs on the executed hypervisor,
wherein each of the executed VMs is configured to provide one or more virtual desktops accessible for the computing device.

3. The system of claim 2, wherein the thin client controller further comprises:
a communication interface module configured to communicate between the thin client controller and the touch screen display over a communication channel; and
a network interface controller configured to support network communication among the virtual desktops, the thin client controller, and the touch screen display over the network.

4. The system of claim 3, wherein the communication channel comprises:
a serial bus;
a universal serial bus (USB);
an inter-integrated circuit (I2C) bus;
a wireless communication channel; and
an intelligent platform management bus (IPMB).

5. The system of claim 1, wherein the touch screen user interface on the touch screen display comprises:
a soft keyboard;
a touch control command area; and
a soft mouse.

6. The system of claim 5, wherein the computer executable code is further configured to:
configure the computing device as the thin client, the soft keyboard, the soft mouse, the touch control command area, the network, and the touch screen display.

7. The system of claim 5, wherein the computer executable code is further configured to:
select a location to enter text by the user by receiving a user touch screen operation at a text box displayed on the touch screen display;
display the soft keyboard to allow the user to enter text; and
enter a key displayed on the touch screen display or a user touch screen operation to remove the soft keyboard and return the touch screen display to display.

8. The system of claim 5, wherein a size and a location of each of the soft keyboard, the touch control command area and the soft mouse are configurable through the computer executable code.

9. The system of claim 1, wherein the computer executable code comprises:
an input module configured to receive the plurality of user touch screen operations;
an input processing module configured to process and interpret the received user touch screen operations, and determine the plurality of thin client management functions to be performed in response to the received user touch screen operations;
a display module configured to display the touch screen user interface, and user interactive response to the user; and an execution module configured to perform the thin client management functions according to the received user touch screen operations.

10. The system of claim 1, wherein the thin client management functions comprise:
starting a virtual desktop session;
displaying a login screen on the touch screen display;
performing virtual desktop operations in the virtual desktop session; and
ending the virtual desktop session.

11. A computer-implemented method of providing touch screen interactive capability support to a computing device, comprising:
displaying, at a processor of a thin client controller of the computing device functioning as a thin client, a touch screen user interface on a touch screen display of the computing device to emulate computer peripherals, wherein the touch screen display supports touch screen interactive capability, and the thin client controller has an operating system not supporting the touch screen interactive capability of the touch screen display;
defining, at the processor of the thin client controller, a plurality of user touch screen operations and a plurality of thin client management functions, wherein each of the thin client management functions corresponds to at least one of the user touch screen operations;
receiving, at the processor of the thin client controller, one or more user touch screen operations from a user through the touch screen user interface on the touch screen display; and
in response to receiving the user touch screen operations, performing, at the processor of the thin client controller, the corresponding thin client management functions based on the received user touch screen operations.

12. The computer-implemented method of claim 11, wherein the computing device comprises:
the touch screen display supporting the touch screen interactive capability; and
the thin client controller comprising:
    the processor;
    a communication interface module configured to maintain communication between the thin client controller and the touch screen display over a communication channel;
    a network interface controller configured to support network communication among a plurality of virtual desktops, the thin client controller, and the touch screen display over a network; and
    a memory having the operating system and computer executable code, wherein the computer executable code, when executed at the processor, causes the processor to support the touch screen interactive capability on the touch screen display.

13. The computer-implemented method of claim 12, wherein the computer executable code comprises:
an input module configured to receive the plurality of user touch screen operations;
an input processing module configured to process and interpret the received user touch screen operations, and determine the plurality of thin client management functions to be performed in response to the received user touch screen operations;
a display module configured to display the touch screen user interface, and user interactive response to the user; and an execution module configured to perform the thin client management functions according to the received user touch screen operations.

14. The computer-implemented method of claim 12, wherein the touch screen user interface on the touch screen display comprises:
a soft keyboard;
a touch control command area; and
a soft mouse.

15. The computer-implemented method of claim 14, further comprising:
configuring, at the processor of the thin client controller, the computing device as the thin client, the soft keyboard, the soft mouse, the touch control command area, the network, and the touch screen display.

16. The computer-implemented method of claim 14, further comprising:
selecting, at the processor of the thin client controller, a location to enter text by the user by receiving a user touch screen operation at a text box displayed on the touch screen display;
displaying, at the processor of the thin client controller, the soft keyboard to allow the user to enter text;
entering, at the processor of the thin client controller, a key displayed on the touch screen display or a user touch screen operation to remove the soft keyboard, and returning the touch screen display to display.

17. The computer-implemented method of claim 14, wherein a size and a location of each of the soft keyboard, the touch control command area and the soft mouse are configurable through the computer executable code.

18. The computer-implemented method of claim 11, wherein the thin client management functions comprise:
starting a virtual desktop session;
displaying a login screen on the touch screen display;
performing virtual desktop operations in the virtual desktop session; and
ending the virtual desktop session.

19. A non-transitory computer storage medium having computer executable code stored thereon which, when executed by a processor of a thin client controller of a computing device functioning as a thin client, is configured to:
display a touch screen user interface on a touch screen display of the computing device to emulate computer peripherals, wherein the touch screen display supports touch screen interactive capability, and the thin client controller has an operating system not supporting the touch screen interactive capability of the touch screen display;
define a plurality of user touch screen operations and a plurality of thin client management functions, wherein each of the thin client management functions corresponds to at least one of the user touch screen operations;
receive one or more user touch screen operations from a user through the touch screen user interface on the touch screen display; and
in response to receiving the user touch screen operations, perform the corresponding thin client management functions based on the received user touch screen operations.

20. The non-transitory computer storage medium of claim 19, wherein the computer executable code comprises:
an input module configured to receive the plurality of user touch screen operations;
an input processing module configured to process and interpret the received user touch screen operations, and determine the plurality of thin client management functions to be performed in response to the received user touch screen operations;
a display module configured to display the touch screen user interface, and user interactive response to the user; and
an execution module configured to perform the thin client management functions according to the received user touch screen operations.

21. The non-transitory computer storage medium of claim 19, wherein the touch screen user interface on the touch screen display comprises:
a soft keyboard;
a touch control command area; and
a soft mouse.

22. The non-transitory computer storage medium of claim 21, wherein the computer executable code is further configured to:
configure the computing device as the thin client, the soft keyboard, the soft mouse, the touch control command area, the network, and the touch screen display.

23. The non-transitory computer storage medium of claim 21, wherein the computer executable code is further configured to:
select a location to enter text by the user by receiving a user touch screen operation at a text box displayed on the touch screen display;
display the soft keyboard to allow the user to enter text; and
enter a key displayed on the touch screen display or a user touch screen operation to remove the soft keyboard and return the touch screen display to display.

24. The non-transitory computer storage medium of claim 21, wherein a size and a location of each of the soft keyboard, the touch control command area and the soft mouse are configurable through the computer executable code.

25. The non-transitory computer storage medium of claim 19, wherein the thin client management functions comprise:
starting a virtual desktop session;
displaying a login screen on the touch screen display;
performing virtual desktop operations in the virtual desktop session; and
ending the virtual desktop session.

* * * * *